Sept. 1, 1942.     R. J. FEUCHTER     2,294,396
AIR BALLASTED ACCUMULATOR AND CONTROL CIRCUIT FOR HYDRAULIC PRESSES
Filed Sept. 15, 1939     3 Sheets-Sheet 1

Inventor:
Robert J. Feuchter
By
Pabst Carlson Stripbaugh & Well
Attys.

Sept. 1, 1942.   R. J. FEUCHTER   2,294,396
AIR BALLASTED ACCUMULATOR AND CONTROL CIRCUIT FOR HYDRAULIC PRESSES
Filed Sept. 15, 1939   3 Sheets-Sheet 2

Inventor:
Robert J. Feuchter
By:
Attys.

Sept. 1, 1942.  R. J. FEUCHTER  2,294,396
AIR BALLASTED ACCUMULATOR AND CONTROL CIRCUIT FOR HYDRAULIC PRESSES
Filed Sept. 15, 1939  3 Sheets-Sheet 3

Inventor:
Robert J. Feuchter
By:
Zabel Carlson Spitzbaugh & Wells
Attys

Patented Sept. 1, 1942

2,294,396

UNITED STATES PATENT OFFICE 2,294,396

AIR BALLASTED ACCUMULATOR AND CONTROL CIRCUIT FOR HYDRAULIC PRESSES

Robert J. Feuchter, Chicago, Ill., assignor to Charles F. Elmes Engineering Works, Chicago, Ill., a corporation of Illinois Application September 15, 1939, Serial No. 295,154

5 Claims. (Cl. 137—78)

The present invention relates to air ballasted accumulators and control circuits therefor adapted to maintain a supply of liquid under pressure for various purposes such, for example, as the operation of hydraulic presses, descaling units, pressure nozzles, etc.

It is the principal purpose of the present invention to provide a device of the character described wherein the accumulator is so connected to the pumping system and the liquid using devices as to maintain the supply of liquid under pressure within certain minimum and maximum level and pressure limits.

The present invention contemplates the provision of pressure responsive and liquid level responsive control devices in combination with a safety valve, all of which automatically operate to control the flow of liquid from the pump to the accumulator and to the liquid using device and the flow of liquid from the accumulator to the liquid using device.

The present invention contemplates also the provision, in a device of the character described, of a novel control arrangement which, at all times, will automatically maintain the pressure in the accumulator within the prescribed limits, even though the control mechanism and the source of energy therefor fail completely.

Other objects and advantages of the present invention will appear more fully as the description proceeds, reference being had to the accompanying drawings wherein a preferred form of the invention is shown. It is to be understood, however, that the drawings and description are illustrative only, and are not to be taken as limiting the invention except insofar as it is limited by the claims.

Figure 1:
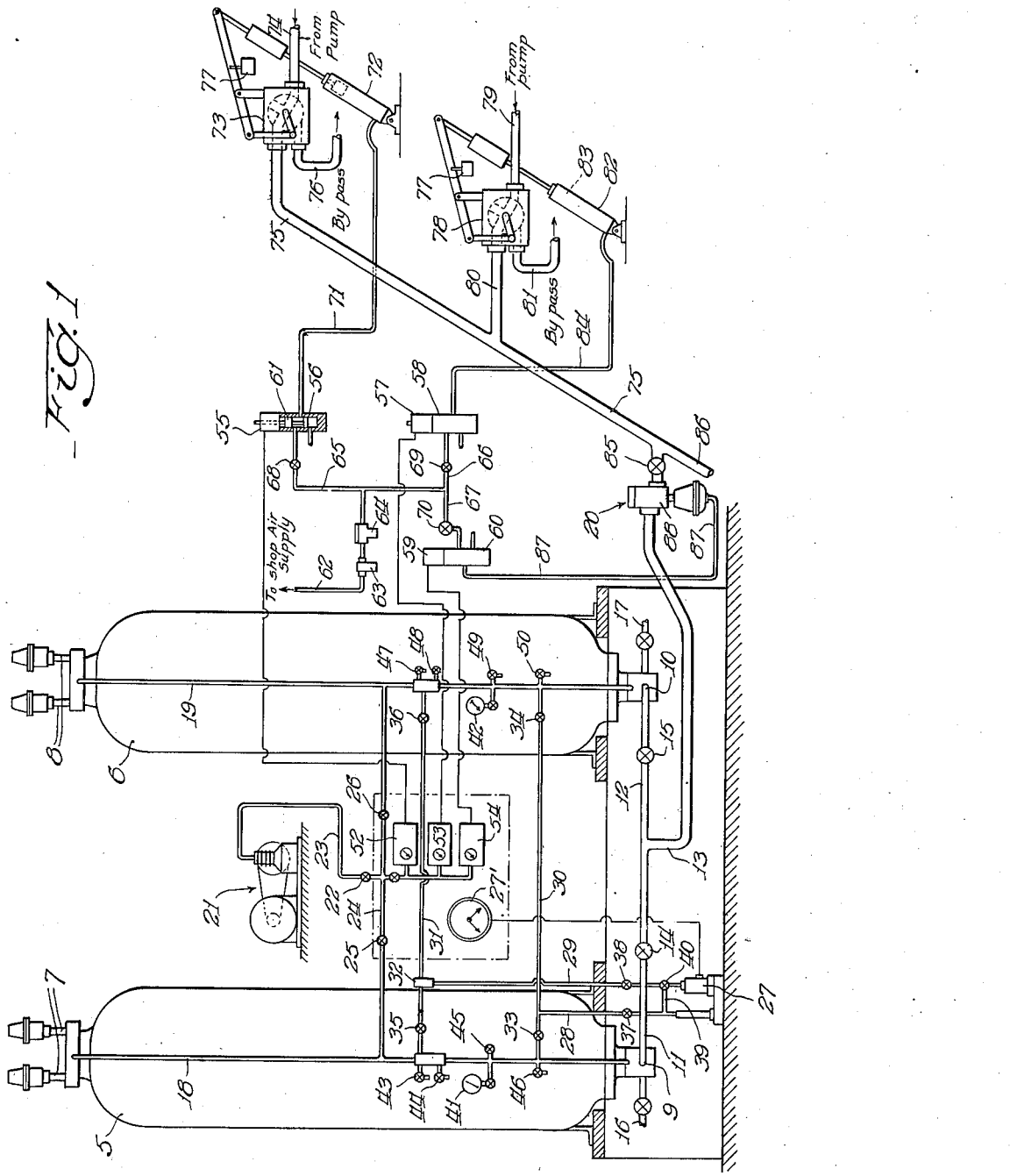
Fig. 1 is a somewhat diagrammatic view illustrating the accumulator and control system.

Referring now to the drawings, the accumulator and pump system is shown diagrammatically in Fig. 1. In this figure, the numerals 5 and 6 indicate two accumulator vessels which are adapted to be charged with air and then partially filled with the hydraulic liquid. The vessel 5 has on the top thereof two high pressure air safety valves 7, and the vessel 6 has similar safety valves 8 at the top thereof. The liquid inlets for the vessels 5 and 6 are shown at 9 and 10. These inlets are connected by two branch pipes 11 and 12 to a main pipe 13. A valve 14 is provided in the pipe 11 and a valve 15 is provided in the pipe 12 so that either accumulator vessel may be isolated from the other, and either vessel may be used independently of the other in the operation of hydraulic presses. A drain pipe 16 is provided for the vessel 5, and a second drain pipe 17 is provided for the vessel 6. For the purpose of observing and controlling the liquid level and the pressure within the accumulator vessels, a control pipe 18 connects the bottom and the top of the vessel 5, and a similar control pipe 19 connects the top and bottom of the vessel 6. The pipes 18 and 19 are both connected to the control apparatus, as will be presently explained.

The control apparatus comprises means for connecting a source of liquid under pressure, such as one or more pumps, to the pipe 13 through a safety closing valve 20. The control system is adapted to actuate the safety closing valve 20 and the liquid supply means in such a fashion as to supply liquid under pressure to the vessels 5 and 6 if the pressure therein is below a certain minimum value, or if the liquid level therein drops below a certain level. The control system also is adapted to by-pass the liquid supply means whenever the pressure or the liquid level in the vessels 5 and 6 exceeds certain predetermined values. The control system is adapted to be operated by certain pressure and liquid level responsive electrical switches and is adapted to utilize the usual shop air supply for the actual control operations. However, in the initial charging of the accumulator vessels, it is necessary to have an air compressor capable of supplying air for the vessels at the pressure desired. An air compressor 21 is illustrated in Fig. 1 and is shown as adapted to be connected through a valve 22 and a pipe 23 to a branch pipe 24 that connects the pipes 18 and 19.

Two valves 25 and 26 are interposed in the pipe 24 between its connection with the pipe 23 and the pipes 18 and 19 respectively. Thus the air compressor 21 may be utilized to fill either the vessel alone or both vessels at the same time. Also, if it is later desired to isolate one accumulator from the control device, which will be later described, the valves 25 and 26 permit such isolation.

A manometer 27 is utilized to indicate on a dial 27' the liquid level within the vessels 5 and 6.

Figure 4:
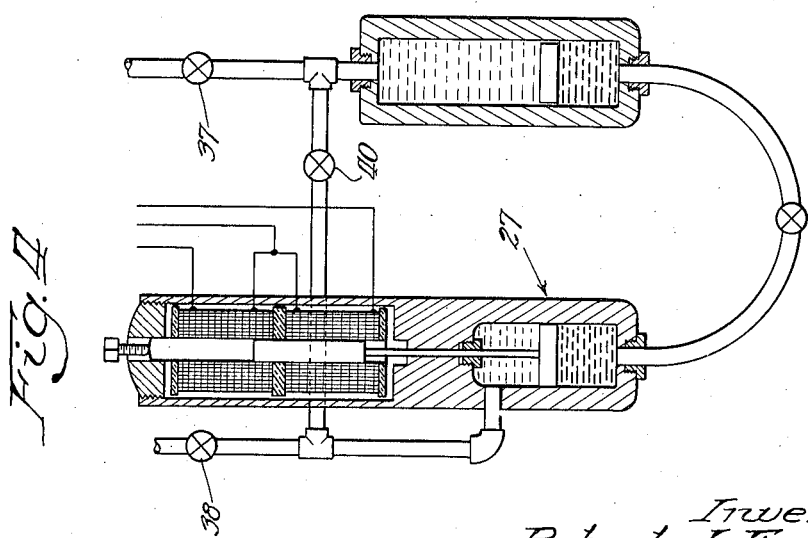
Fig. 4 is a sectional view through the liquid level control device.

This manometer is of a well-known construction, the details of which are diagrammatically illustrated in Fig. 4. Such a manometer is made and sold by the Brown Electric Company, under the name of "Brown Electric Flow Meter." The manometer 27 is connected by means of its pipes 28 and 29 to a lower cross connecting pipe 30 and an upper cross connecting pipe 31. The pipe 29 leads to the pipe 31, while the pipe 28 leads to the lower pipe 30. A condenser 32 is provided at the top of the pipe 29. The pipe 30 has valves 33 and 34 therein in order that either vessel 5 or 6 may be isolated from it. The pipe 31 is equipped with two valves 35 and 36 for the same purpose. The pipes 28 and 29 have valves 37 and 38 therein so that the manometer may be cut off the line, if desired. A cross connection 39 controlled by a valve 40 is also provided for the pipes 28 and 29.

The pipes 18 and 19 are utilized for connecting the usual pressure gauges 41 and 42 to the vessels 5 and 6. The pipe 18 has a plurality of test valves 43, 44, 45 and 46 for determining the existing liquid level in the vessel 5 independently of the manometer and the other control apparatus. Similarly, the pipe 19 is provided with test valves 47, 48, 49 and 50.

In addition to the manometer 27 and its dial 27', there is included a liquid level responsive switch mechanism 51 (see Fig. 2) which is adapted to be operated by the effect of variations in liquid level upon the manometer 27. In addition, three pressure responsive control switches 52, 53, and 54 are provided. The switch 52 is electrically connected to an electromagnet 55 which is adapted to control an air valve 56. The switch 53 is electrically connected to an electromagnet 57 which is adapted to control an air valve 58. The switch 54 is electrically connected to an electromagnet 59 which controls an air valve 60. Three valves 56, 58 and 60 are of like type, and each contains a movable valve 61 which is adapted, when the electromagnet associated therewith is energized, to connect a source of shop air supply to an operating control device. When the electromagnets are deenergized their valves are adapted to connect the control device to an exhaust pipe and to shut off the shop air supply.

The shop air supply is indicated as connected to a pipe 62 which leads through a strainer 63 and a lubricator 64 to three branch pipes 65, 66 and 67. The branch pipe 65 is connected through a valve 68 to the electrically operated valve 56. The branch pipe 66 is connected through a valve 69 to the electrically operated valve 58, and the branch pipe 67 is connected through a valve 70 to the electrically operated valve 60. An air pipe 71 leads from the valve 56 to a cylinder 72, a piston of which is adapted to operate a by-pass valve 73. The by-pass valve 73 is so arranged as to direct liquid from a pipe 74 to a distributor pipe 75 or a by-pass pipe 76. The pipe 74 is adapted to receive liquid under pressure from a suitable pump such as is commonly used to supply hydraulic presses. The valve 73 is adapted, when air is supplied to the cylinder 72, to connect the pipe 74 to the distributor pipe 75. When the air pressure is withdrawn from the cylinder 72, then the valve 73 is adapted to be rotated by any suitable means such as a weight 77 in the position to connect the supply pipe 74 to the by-pass 76 which returns the liquid to a reservoir or tank supplied for the pump. The pump and reservoir are not shown herein, since they are well-known in the art and form no part of the present invention.

The distributor pipe 75 is also adapted to receive liquid through a second valve 78. The valve 78 is substantially the same in construction as the valve 73. It receives liquid through a pipe 79 from a suitable pump and discharges into the distributor pipe 75 through a pipe 80. A by-pass 81 leads from the valve 78 to the reservoir for the second pump. The valve 78 is controlled by the electrically operated valve 58 through a cylinder 82 and a piston 83. An air pipe 84 leads from the valve 58 to the cylinder 82.

Figure 3:
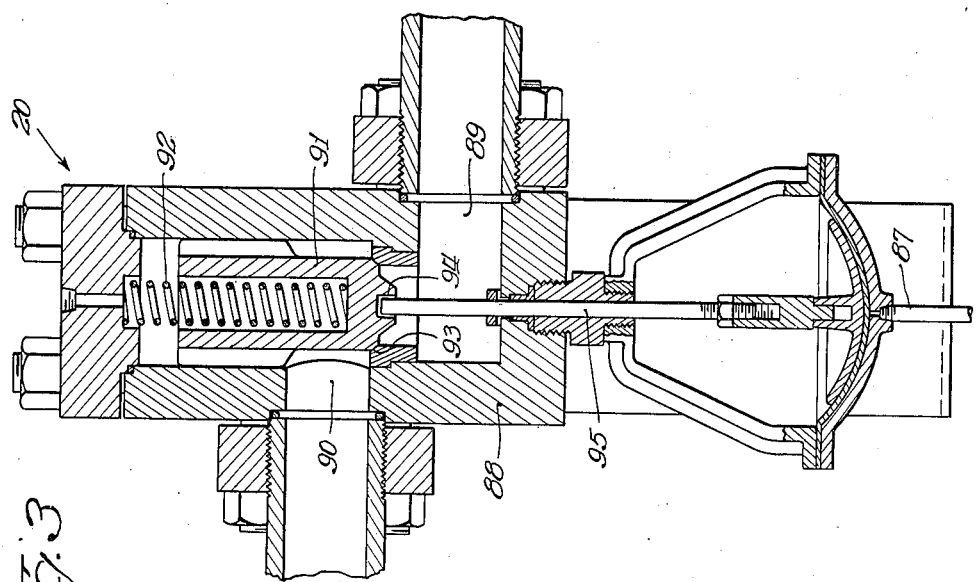
Fig. 3 is a sectional view taken through the safety valve for the accumulator.

The distributor pipe 75 is connected to the safety closing valve 20 through a manually operable valve 85, and is also adapted to supply liquid directly to the presses through a pipe 86. The safety closing valve 20 is controlled by means of the air valve 60 and an air pipe 87. This valve is shown in detail in Fig. 3 of the drawings. The valve comprises a valve body 88 having a port 89 leading to the pipe 75 and a port 90 leading to the pipe 13. A valve head 91 is slidably mounted in the body 88 and is pressed downwardly by a spring 92 against a valve seat 93. The head 91 has a socket 94 adapted to receive the upper end of a stem 95 which is pressed upward by air received through the pipe 87. When the air pressure in the pipe 87 is released, the spring 92 will maintain the valve closed, provided there is not sufficient excess pressure in the distributor pipe 75 to overcome the force of the spring 92 and the pressure in the accumulator vessels 5 and 6.

Figure 2:
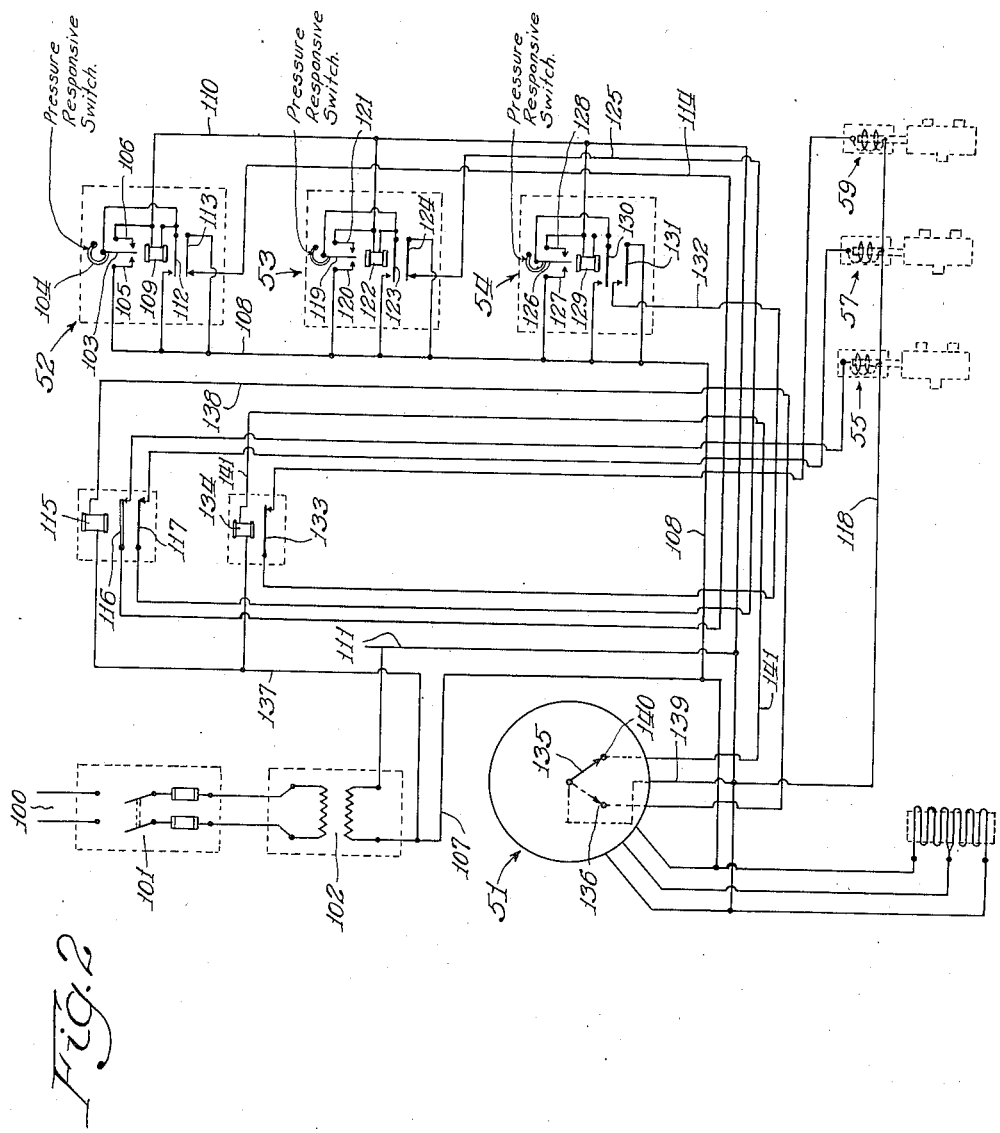
Fig. 2 is a wiring diagram showing the electrical connections to the various equipment by which the control is effected.

Referring now to Fig. 2, the electrical circuits adapted to be controlled by the pressure operated switches 52, 53 and 54 and the liquid level control switch 51 will be described. Current is adapted to be supplied from a suitable source, indicated at 100, through a manually operable switch 101 to a transformer 102. It will be understood that the transformer is needed only where the voltage of the source of current supply is not the correct voltage for the operation of the electrical controls used. The pressure responsive switch 52 comprises a contact arm 103 which is operated by any suitable pressure responsive device such as a Bourdon tube 104. The contact 103 is adapted to engage either one of two stationary contacts 105 and 106. When the contact 105 is engaged by the element 103, a circuit is completed from one side of the transformer 102 over a lead 107 and a branch lead 108 through the elements 103 and 105 to a relay 109, and from this relay over a lead 110 and a lead 111 to the other side of the transformer. This energizes the relay 109 and causes it to attract its armatures 112 and 113. The armature 112 closes a holding circuit for the relay 109. The armature 113 opens a circuit to cause the deenergization of the electromagnet 55. This circuit can be traced from one side of the transformer over leads 107 and 108 to the armature 113 and thence over a lead 114 to the normally closed contacts of an armature 116 controlled by a relay 115, then to the electromagnet 55 and over a return lead 118 to the lead 111 and the other side of the transformer. The deenergization of the electromagnet 55 causes the valve 56 to exhaust the air in the pipe 71 and the cylinder 72 so as to move the valve 73 into by-pass position. If the pressure in the accumulator vessels falls below the predetermined value, the contact element 103 will engage the stationary contact 106 which short-circuits the relay 109 temporarily and causes its armatures 112 and 113 to drop back, thus closing the energizing circuit at armature 113 for the electromagnet 55.

The pressure switch 53 includes a movable contact 119 and two stationary contacts 120 and 121 which control the operation of a relay 122 in the opening and closing of its armatures 123 and 124. The armature 124 controls the energization of the electromagnet 57 over a lead 125, normally closed armature 117 of the relay 115, and the return lead 118. The operation of the relay 122 under control of the contact arm 119 is substantially the same as that of the relay 109 except that the low pressure limit in contact 121 is set lower than the contact 106. The closing of the armature 124 moves the valve 78 into position to supply liquid under pressure to the distributor pipe 75.

The pressure switch 54 includes pressure responsive contact 126 and two stationary contacts 127 and 128 controlling a relay 129. The relay 129 has two normally open armatures 130 and 131. The armature 130 controls a locking circuit for locking the relay 129 energized. The armature 131 controls the flow of current from the lead 108 to the electromagnet 59 which controls the supply of air to the diaphragm of the safety valve 20 by means of the air valve 60. The circuit for the electromagnet 59 may be traced from the lead 108 through the armature 131 over a lead 132 and normally closed armature 133 of a relay 134 to the electromagnet 59 and back to the other side of the transformer over the leads 118 and 111. The relays 115 and 134 are adapted to be controlled by the switch 51 of the liquid level gauge or manometer 27. As shown diagrammatically in Fig. 2, the relay 115 is energized when the switch 51 connects its movable contact 135 to stationary contact 136. This circuit may be traced from one side of the transformer over a lead 137 to the relay 115, then over a lead 138 to the stationary contact 136 to movable contact 135 and over its lead 139 to the common lead 111 which connects to the other side of the transformer. The relay 134 is adapted to be energized when the movable contact 135 engages a stationary contact 140 of the switch 51. This energizing circuit may be traced from the lead 137 through the relay 134 and a lead 141 to the stationary contact 140, and then over the lead 139 to the common lead 111.

In starting the system shown in Fig. 1, it is first necessary to charge the accumulator vessels 5 and 6 with air under pressure. In order to do this, the valves 22, 25 and 26 are first closed, the vessels 12 and 14 are opened, and the drain valves 16 and 17 are closed. The valves 37 and 38 of the manometer lines are opened. Also the valves 33, 34, 35 and 36 are opened. The condenser 32 has a plug in the top which is removed and this condenser is filled with water, the stand-pipe 29 of course being filled at the same time. The level of the water in the condenser is brought up to the level of the pipe 31. The condenser is then filled so as to prevent any leakage of air. The electrical equipment is cononected up, as shown in Fig. 2, and water under pressure is pumped through the supply pipe 74 into the vessels 5 and 6 until the water level reaches the lower test valves 44 and 48. At this point, the supply of water is cut off. Valves 22, 25 and 26 are next opened and the shop air supply may be connected to the pipe 23 to fill the accumulator vessels to the limit of the shop air pressure. If preferred, however, the shop air pressure can be left off and the air compressor 21 used to initially charge the accumulator vessels. The shop air pressure must be disconnected before the charging of the vessels exceeds the normal pressure of the shop air system.

The air compressor 21 is utilized to charge the vessels up to full working pressure which, for example, will be assumed to be 2500 pounds per square inch. When the vessels are fully charged to this pressure, the valve 22 is closed to cut off the air compressor from the accumulator system. The system is now ready for operation. Liquid under pressure is supplied from two pumps to the pipes 74 and 79. Since the accumulator is fully charged, the valves 73 and 73 will be so positioned as to connect the supply pipes 74 and 79 with the by-pass pipes 76 and 81. In the normal position, the pressure control switch 54 is closed and energizes the electromagnet 59 so as to supply air under pressure to the diaphragm of the valve 20 and hold this valve open ready for discharge. The switches 52 and 53 are in position to de-energize their respective electromagnets 55 and 57 so that the air will be exhausted from the control cylinders 72 and 82.

When the presses are started in operation to take liquid from the pipe 86, the pressure will gradually drop in the accumulator vessels 5 and 6. After the pressure has dropped a predetermined amount, say to 2400 pounds, the switch 52 will move its contact element 103 into engagement with the stationary contact 106. This de-energizes the relay 109 and allows the armature 113 to drop back and close a circuit for the electromagnet 55. This moves the valve plunger 61 of the valve 56 into position as shown in Fig. 1, so as to supply shop air to the cylinder 72 and connect the supply pipe 74 to the pipe 75. Thus liquid under pressure is forced into the distributor pipe 75 for use either in charging the accumulator vessels 5 and 6 with liquid or in feeding the presses. If the presses continue to take more liquid than can be supplied at 2400 pounds pressure by the supply pipe 74, the excess liquid will be supplied from the vessels 5 and 6 until the pressure therein drops to a further low level, which, for the purposes of illustration, we will assume to be 2350 pounds. At this pressure, the switch 53 moves its movable contact 119 into engagement with the stationary contact 121 to de-energize the relay 122. The armature 124 drops back and closes the energizing circuit for the electromagnet 57 so as to open the valve 58 and admit air pressure to the cylinder 82. This connects the supply pipe 79 to the distribution pipe 75.

Further withdrawal of liquid from the vessels 5 and 6 may be continued until the pressure drops therein to another predetermined level, say 2270 pounds. At this predetermined level, the pressure switch 54, which is normally in the position with its relay 129 energized to attract the armature 131 and energize the electromagnet 59, will be moved to the position to de-energize the relay 129 by closing the contacts 126 and 128. When this occurs, the electromagnet 59 is de-energized and air pressure is released from the pipe 87, allowing the diaphragm 96 of the valve 20 to drop to the position shown in Fig. 3 so that the valve 20 will close and prevent any further withdrawal of liquid from the accumulator vessels.

When the presses have been supplied, and no additional pressure liquid is required, the pump discharge into the distributor pipe 75 passes directly to the accumulator vessels through the valve 20 which now acts as a check valve. As soon as the pressure in the accumulator vessels reaches 2370 pounds, the switch 54 again closes the energizing circuit for the electromagnet 59 by swinging the movable contact 126 into engagement with the stationary contact 127. This admits air pressure to the diaphragm of the valve 20 and opens the valve for further withdrawal of liquid, if necessary.

When enough liquid is pumped into the vessels 5 and 6 to raise the pressure therein to the original charging pressure of 2500 pounds, or high water level is reached, the switches 52 and 53 de-energize the electromagnets 55 and 57 thereby exhausting the air cylinders 72 and 82 so that the valves 73 and 78 can return to by-pass position under influence of the weights 77. In this condition, the accumulator vessels are fully charged and ready for another cycle.

As an emergency safety measure, the liquid level controlling switch 51 is adapted to control the high and low liquid level independent of pressure. The top level is so adjusted that at three inches above the normal liquid high water level for 2500 pounds pressure, the circuit is closed to energize the relay 115 and thus open the circuits for the electromagnets 55 and 57. This will release air from the cylinders 72 and 82 and move the valves 73 and 78 to by-pass position. The lower level index is set so that upon withdrawal of the amount of liquid necessary to drop the liquid level in the vessels to a point normally corresponding to about 2160 pounds working pressure, the switch 51 will energize the relay 134 and open the circuit for the electromagnet 59. This will exhaust the air pressure from the diaphragm of the safety valve 20, thereby closing this valve and preventing excessive withdrawal of liquid from the accumulator vessels and preventing high pressure air from entering the press system. This emergency liquid level control acts as a safety in the event that one of the pressure switches 52, 53 or 54 fails to operate properly.

The present system is so designed that it is protected against failure of operation of the several control elements. In the case of air failure in the shop air line, the safety valve 20 will close due to lack of air pressure on its diaphragm, and thus prevent withdrawal of liquid from the accumulator vessels. Also, the failure of the shop air pressure causes both the by-pass valves 73 and 78 to by-pass the high pressure liquid from the pipes 74 and 79 back to the supply tank. In the event the electrical current fails, the valve 20 will also be closed since de-energizing the electromagnet 59 results in discharging the air pressure from beneath the diaphragm of the valve 20. This will prevent discharge of liquid from the accumulator vssels. The by-pass valves 73 and 78 will also be moved to by-pass position in the case of electrical current failure.

It will be seen that as the accumulator discharges through its normal operating range, that is from 2500 pounds down to 2400 pounds, the pumps are not in communication therewith. At this lower limit, however, the first pump cuts in, and if the demand is not too great, the accumulator will gradually be charged up to the upper limit of the normal operating range. If the demand is sufficiently great so as to prevent the build-up of pressure in the accumulator, the second pump will cut in at 2350 pounds, and in this instance the supply will be sufficient to bring the accumulator up to the upper limit. It will thus be seen that the pressure in the accumulator, and in the whole system continuously operates between the upper and lower limits of the normal operating range of pressure. By virtue of such an arrangement, the pumps are cut in and out less frequently than would be the case if such a control arrangement were not provided. This arrangement obviates the strain which is imposed upon the pump motors when they are cut in and out frequently as the pressure fluctuates narrowly above and below the maximum pressure of the usual accumulator system.

It will be further noted that even at the lower limit of the normal operating range, there is an additional reserve supply of liquid which is available for unusually heavy demands, and the amount of this additional supply is determined by the safety check valve.

From the foregoing description it is believed that the construction and operation of this device will be readily apparent to those skilled in this art. Having thus described my invention, what I claim as new and desire to secure by Letters Patent is:

1. In a system for supplying liquid under pressure for hydraulic machinery, an accumulator vessel adapted to receive and hold a reserve supply of liquid under pressure and to hold a charge of air therein to supply the pressure on said liquid, a valve biased to closed position to govern the flow of liquid from the vessel, and control means for said valve responsive to variations in pressure in said vessel arranged to open and to hold said valve open when the pressure in the vessel respectively reaches or is above a predetermined limit, said control means being operable to permit the valve to close against further liquid discharge from the vessel when the pressure therein drops below said limit by a predetermined amount, the valve being arranged to permit liquid at a pressure greater than the pressure within said vessel to enter the vessel through said valve in order that the pressure therein may be increased up to said predetermined limit in order to actuate said control means to open said valve.

2. In a system for supplying liquid under pressure for hydraulic machinery, an accumulator vessel adapted to receive and hold a reserve supply of liquid under pressure and to hold a charge of air therein to supply the pressure on said liquid, a valve governing the flow of liquid to and from the vessel, control means for said valve responsive to variations in pressure in said vessel to hold said valve open when the pressure in the vessel is above a predetermined limit, said control means being operable to close the valve against further liquid discharge from the vessel when the pressure therein drops below said limit by a predetermined amount, and to maintain said valve closed to discharge until the pressure therein exceeds said limit, but to permit liquid to enter the vessel through said valve, said control means comprising a diaphragm for said valve, means for biasing said valve to closed position, a source of air under pressure, an air valve adapted when open to supply air under pressure from said source to said diaphragm and open said first named valve, and when closed to exhaust air from the diaphragm whereby the first named valve may close, and means responsive to pressure drop in said vessel below said predetermined limit by said predetermined amount to close said air valve and responsive to a pressure rise therein up to said predetermined limit to open said air valve.

3. A system for effecting delivery of liquid under pressure to hydraulic machinery from a suitable source and for maintenance of reserve liquid to augment the supply of liquid from said source in intervals of large demand by the machinery, said system comprising an air ballasted accumulator vessel, a source for the supply of liquid under pressure, a distributor pipe for supplying liquid from said source, said pipe having a branch leading to said vessel, a safety check valve operable to permit liquid to flow into said vessel, a by-pass valve controlling the supply of liquid from the source to said distributor pipe, control means operable to open said safety check valve when the pressure in said vessel is above a predetermined limit and to maintain said valve open until the pressure in said vessel has dropped below said limit by a predetermined amount, and control means responsive to pressure in said vessel to by-pass liquid from said source when the pressure in said vessel exceeds a predetermined limit above the first named predetermined limit and until such time as the pressure in said vessel has dropped below said second limit by a predetermined amount not in excess of the difference between said limits.

4. In an air ballasted accumulator system of the character described comprising a vessel charged with gas and a liquid, a control valve controlling the flow of liquid to and from the vessel, means to supply liquid under pressure to said valve, and operating means for said valve responsive to changes in pressure within said vessel, said operating means acting to open said valve when the pressure in said vessel rises above a predetermined value whereby to permit flow of liquid from the vessel and becoming ineffective to hold said valve open when the pressure in the vessel drops a predetermined amount below said predetermined value.

5. In an air ballasted accumulator system of the character described comprising a vessel charged with gas and a liquid, a control valve controlling the flow of liquid to and from the vessel, means to supply liquid under pressure to said valve, and operating means for said valve responsive to changes in pressure within said vessel, said operating means acting to open said valve when the pressure in said vessel rises above a predetermined value whereby to permit flow of liquid from the vessel and becoming ineffective to hold said valve open when the pressure in the vessel drops a predetermined amount below said predetermined value, said valve being capable of opening when the pressure upon it from said supply source exceeds the vessel pressure by a predetermined amount.

ROBERT J. FEUCHTER.